United States Patent

[11] 3,627,147

[72] Inventors James M. Yowell;
Thomas C. Soran, both of Hoquiam, Wash.
[21] Appl. No. 870,236
[22] Filed July 10, 1969
[45] Patented Dec. 14, 1971
[73] Assignee Lamb-Grays Harbor Co., Inc.
Hoquiam, Grays Harbor County, Wash.
Continuation of application Ser. No. 633,884, Apr. 26, 1967, now abandoned.
This application July 10, 1969, Ser. No. 870,236

[54] SYSTEM FOR UPENDING AND PALLETIZING OBJECTS
9 Claims, 8 Drawing Figs.
[52] U.S. Cl. .................................................. 214/1 Q,
214/6 P, 214/130 C
[51] Int. Cl. ........................................................ B65g 7/00
[50] Field of Search .......................................... 214/1, 1 R,
6 P, 130 C; 198/33 R, 35, 103, 209

[56] References Cited
UNITED STATES PATENTS
| | | | |
|---|---|---|---|
| 2,828,031 | 3/1958 | Babcock et al. | 214/6 B UX |
| 3,279,664 | 10/1966 | Lynch | 214/8.5 X |
| 3,412,873 | 11/1968 | Barker | 214 1/ |
| 3,434,602 | 3/1969 | Vann | 214/1 R |

Primary Examiner—Gerald M. Forlenza
Assistant Examiner—Frank E. Werner
Attorney—Seed, Berry and Dowrey ABSTRACT: An upender section receives an object, upends the object and displaces the upended object onto a pallet. The pallet is adjustably supported by a rotatable and axially movable turntable mounted on an undercarriage for movement toward and away from the upender frame. Forward and rearward pallet positioning assemblies are disposed on opposite sides of the turntable to position a pallet thereon.

Patented Dec. 14, 1971
3,627,147
5 Sheets-Sheet 1
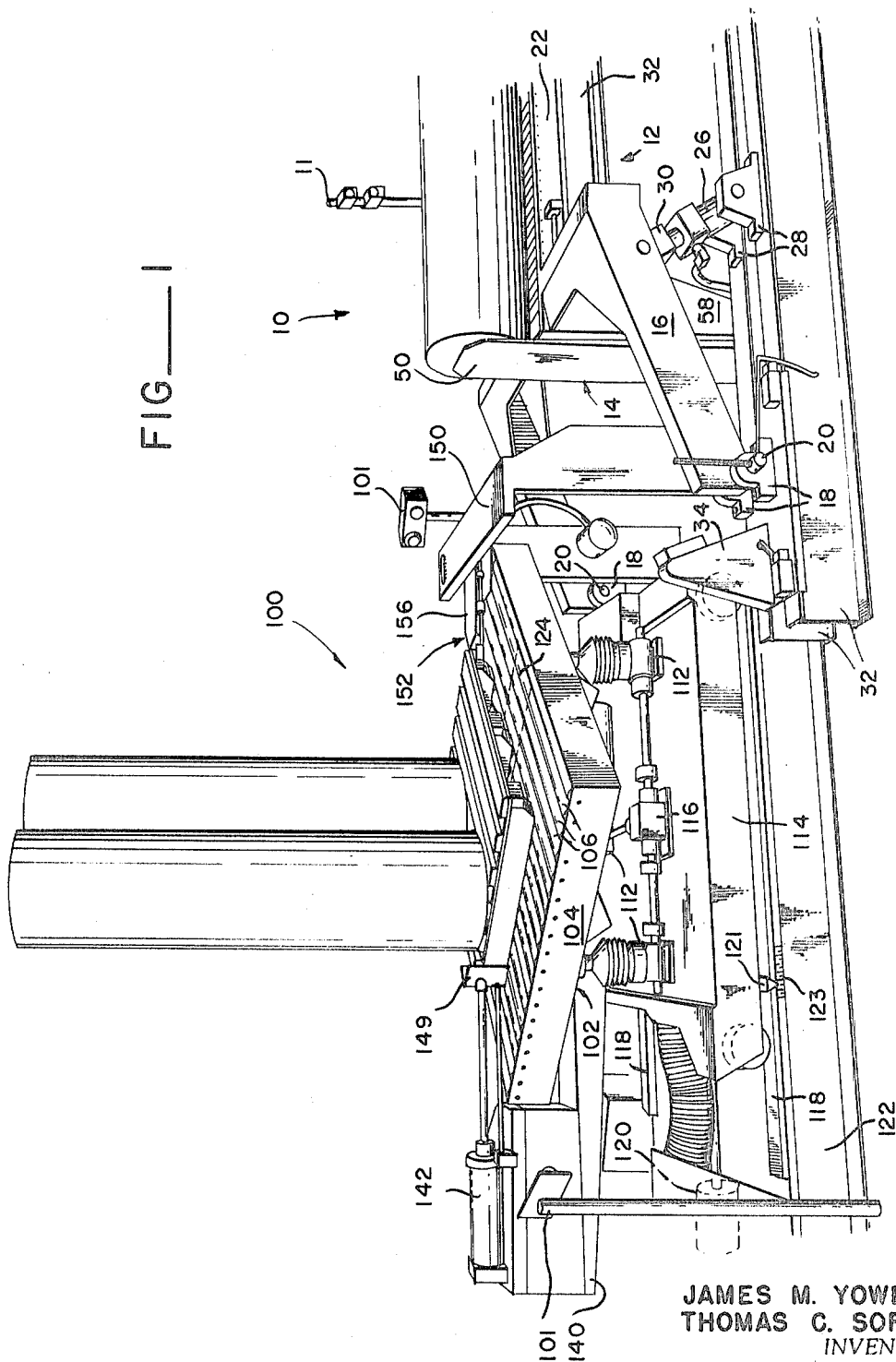
FIG__1
JAMES M. YOWELL
THOMAS C. SORAN
INVENTORS
BY *Seed, Berry & Dowrey*
ATTORNEYS

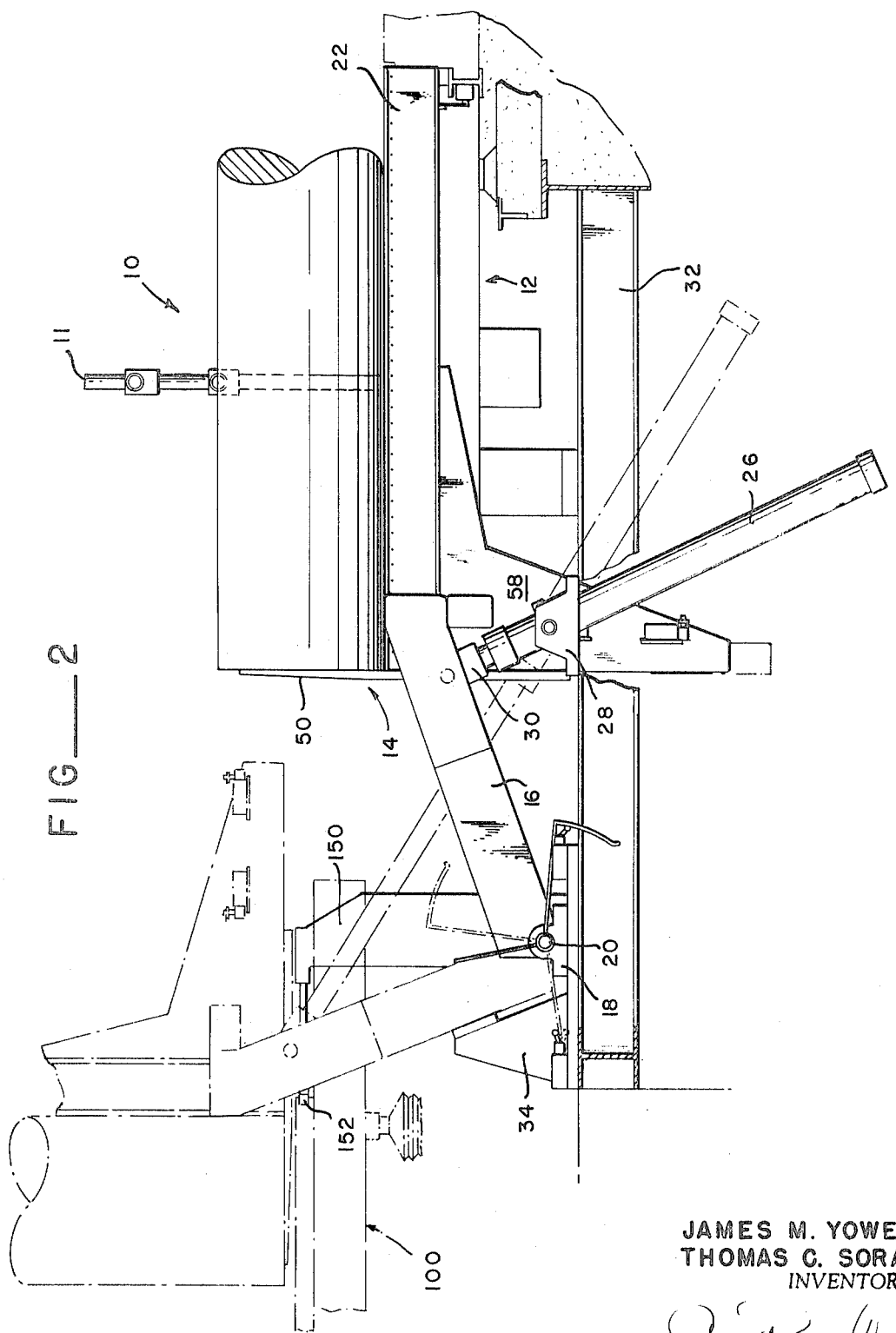

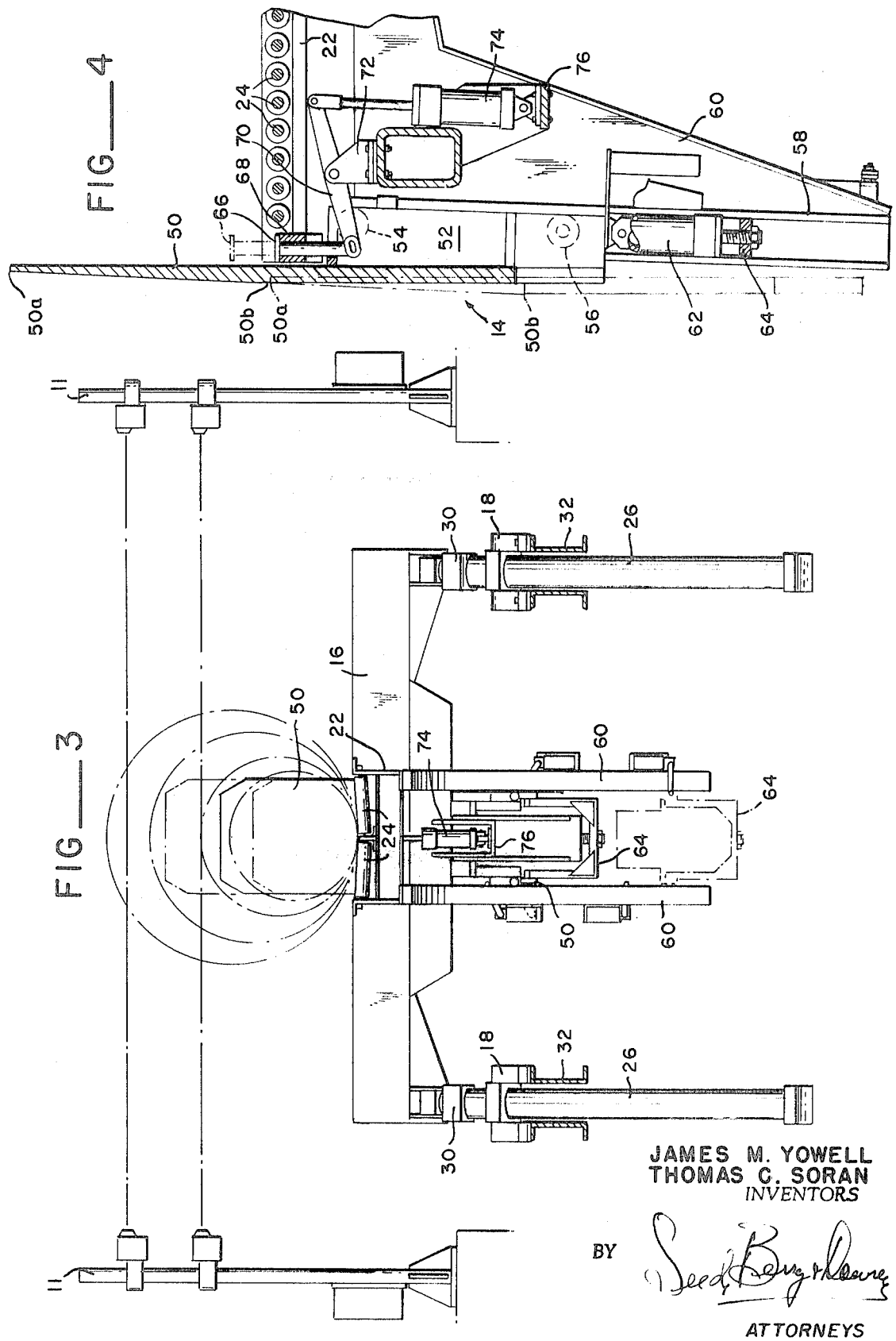

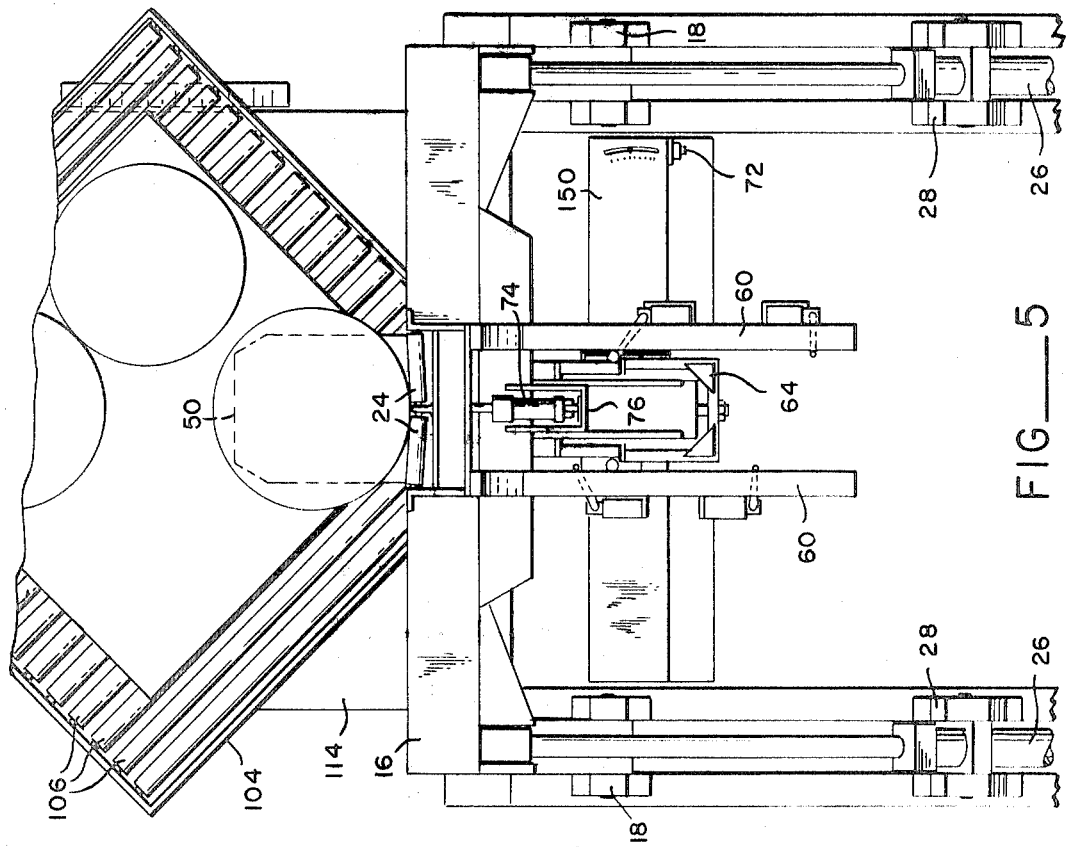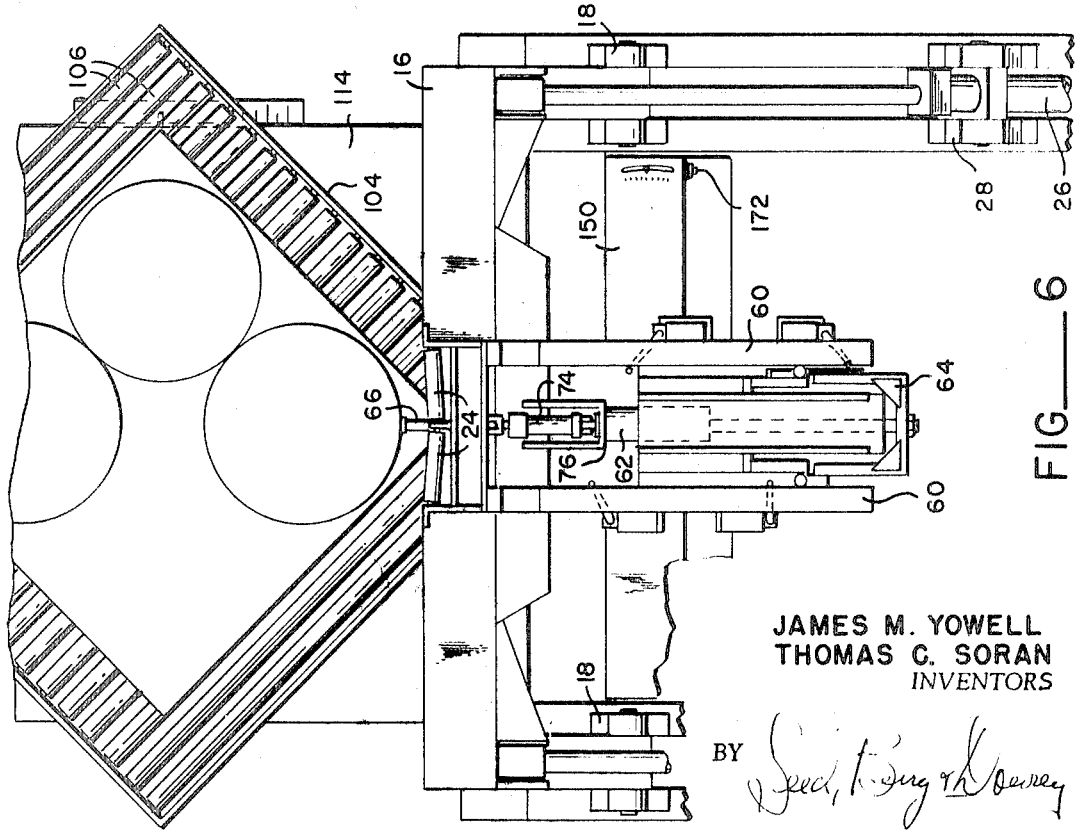

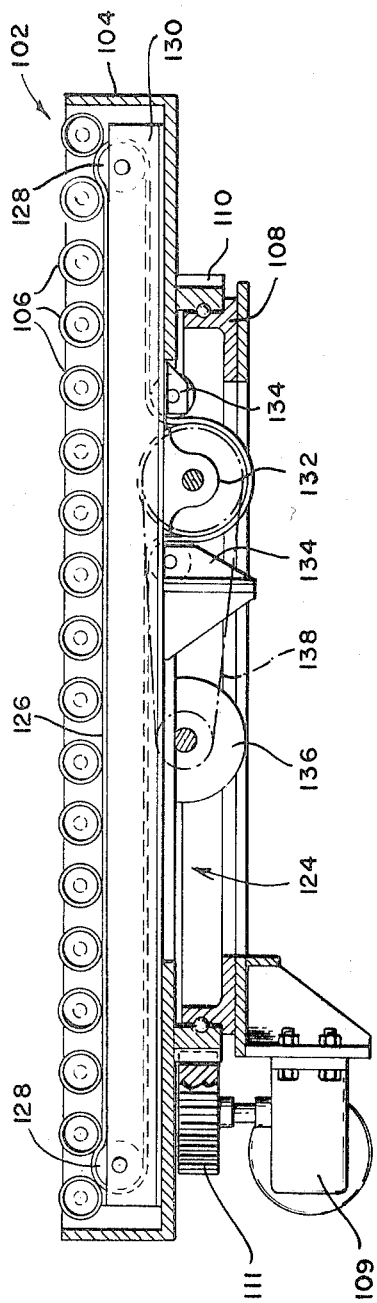
FIG—7
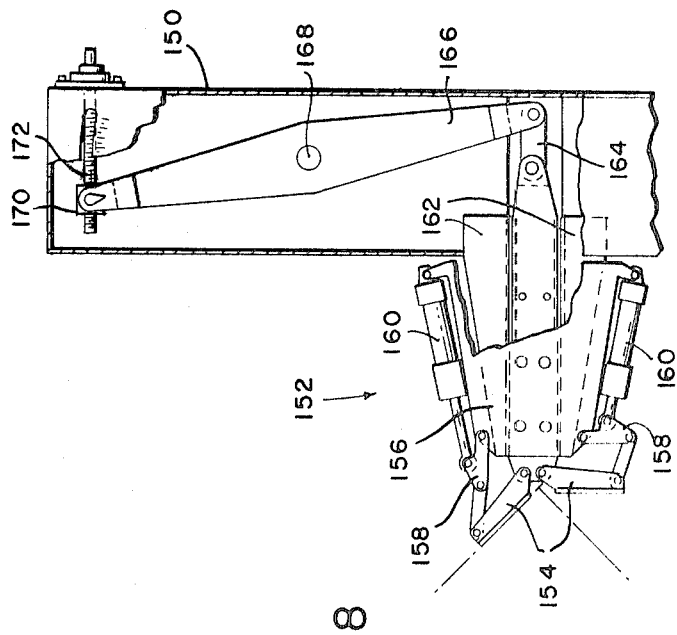
FIG—8
JAMES M. YOWELL
THOMAS C. SORAN
*INVENTORS*
BY
*ATTORNEYS*

SYSTEM FOR UPENDING AND PALLETIZING OBJECTS

This application is a continuation of Ser. No. 633,884, filed Apr. 26, 1967, now abandoned.

This invention is a system for upending objects onto a pallet or other platform. The invention has special application in material-handling systems that convey objects on their side but palletize or otherwise store or utilize them upright on their ends. Such systems include paper roll handling systems and aluminum ingot handling systems, both paper rolls and ingots being conventionally conveyed on their sides and stored or otherwise utilized in an upright position. The invention is depicted and described in a form adapted to upending rolls of paper but it is to be understood that it has wider applicability.

In the depicted and described system, a paper roll is received on its side at an upender section or station, upended to an upright position to overlay a palletizer section or station, and displaced onto a pallet that has been previously positioned at the palletizer section for receipt of the upright roll. If more than one roll is to be placed on the pallet, the palletizer section is operated to reposition the pallet preparatory to receiving another upright roll from the upender section.

The two sections of the system, i.e. the upender section and the palletizer section, are not necessarily limited in their application only to systems incorporating the other. For example, the upender section could be used in conjunction with a handling system whereby an object conveyed on its side must be upended and thence conveyed on its end. Also, the palletizer section could be used in conjunction with a handling system whereby an object must be conveyed from one conveyor to another whose elevation or direction is different.

In brief, the system of this invention comprises an upender section adapted to receive an object when in a lowered position and to swing to a raised position thereby upending the object, and adapted to displace the object onto a pallet or other platform. The system also comprises a palletizer section adapted to position a pallet or other platform relative to the upender section for receipt of the upended object. The upender section comprises an upender frame pivotally mounted and adapted to swing about the pivot from a lowered position to a raised position and back again, and a support assembly including a support shoe retractably mounted on the upender frame for carrying an object in its upright position when the upender section is raised and for displacing the upright object onto a platform. The palletizer section comprises a support table adjustably positionable relative to the upender frame for supporting a pallet or other platform, and means for positioning a pallet or other platform on the support table preparatory to receiving the upright object.

In the drawings:

FIG. 1 is an overall perspective view of the system of this invention as adapted to handle rolls of paper;

FIG. 2 is a side view of the upender section of the FIG. 1 embodiment;

FIG. 3 is an elevation view from the head of the FIG. 2 upender section looking toward the foot of the upender section;

FIG. 4 is an enlarged detail cross section illustrating the support assembly of the FIG. 2 upender section;

FIGS. 5 and 6 are plan views of the FIG. 1 embodiment illustrating a sequence of operation of the upender section when in a raised position;

FIG. 7 is an enlarged detail cross section illustrating the roll driving assembly and turntable rotating assembly of the palletizer section of FIG. 1; and FIG. 8 is an enlarged detail cross section illustrating the forward pallet positioning mechanism of the FIG. 1 palletizer section.

With reference to FIGS. 1 and 2, a preferred embodiment of the system comprises an upender section 10 and a palletizer section 100. The upender section comprises a pivotally mounted upender frame 12 adapted to receive an object (paper roll) in the lowered position shown in FIG. 1 and to swing upright to the raised position shown in dotted line in FIG. 2. The upender section also comprises a support assembly 14 including a shoe 50 retractably mounted on the upender frame and adapted to support an object in the upright position shown in dotted line in FIG. 2. The palletizer section comprises a support table 102 mounted for vertical, circular and transverse adjustment by means variously numbered and identified hereinafter. The palletizer section also comprises means for positioning a pallet 200 or other platform on the support table, such means being variously numbered and identified hereinafter. The means for adjusting the support table and the means for positioning the pallet are interrelated such that a pallet of any size can be properly positioned relative to the upender frame for receipt of a preselected number of upright objects.

The upender frame 12, previously identified, comprises a U-shaped reinforced yoke 16, the legs of which are pivotally journaled in bearing blocks 18 by stub shafts 20, and a bed 22 extending outwardly from the head of the yoke 16 at an oblique angle thereto such that the top surface of the bed is substantially horizontal—head to foot—when the upender frame is in the lowered position shown in FIG. 1 with the bed elevation being above the elevation of bearing blocks 18. Rolls 24 are journaled to the upper sides of the bed 22 to facilitate conveyance of an object to the foot of the bed, as depicted in FIGS. 1 and 2. A pair of double-acting hydraulic cylinders 26—26 are pivotally mounted by blocks 28 and their respective rods are dead-ended to keeper blocks 30 pivotally mounted to the legs of yoke 16 near the yoke head. The stroke of the cylinders 26—26 is sufficient to swing the upender frame to the upright position shown in dotted line in FIG. 2. The respective left- and right-hand bearing blocks 18—18 and blocks 28—28 are mounted on stationary beams 32—32 which straddle the upender frame as shown. Forwardly of the bearing blocks 18—18, bumper stops 34—34 are mounted on beams 32—32 and designed to be contacted by the legs of yoke 16 to prevent further upender-raising pivotal movement of the yoke 16 beyond the upright position shown in dotted line in FIG. 2.

The support member 14, previously identified, comprises a retractable shoe 50 having left- and right-hand side plates 52 with forward and rearward rollers 54–56 journaled thereto for rolling contact on the upper walls of left- and right-hand guide channels 58. Guide channels 58 are mounted on left- and right-hand mounting plates 60 that extend perpendicularly to the bed 22 as shown in FIGS. 2 and 3. These guide channels 58 are askew with respect to the bed 22 such that the angle therebetween is slightly greater than 90°. Thus, as the shoe 50 is retracted from the extended position, shown in solid line in FIG. 3, to the retracted position shown in dotted line in FIG. 3, it will shift outward away from the foot of bed 22 as shown. The outer face of shoe 50 is tapered, beginning at 50b, toward the shoe end 50a, as shown, parallel with the guide channels 58 such that the tip 50a, when the shoe is fully retracted, will be at the same position relative to bed 22 as the beginning 50b of the taper, when the shoe is fully extended. The shoe is extended and retracted by a hydraulic cylinder 62, the head end of which is mounted from the head of yoke 16 and the rod of which is adjustably attached to a cross frame structure 64 mounted on and extending rearwardly of the inner end of the shoe 50.

A flat-ended pusher rod 66 is slidably contained in a bearing 68 at the foot of the bed 22 and shifted out beyond the plane of the bed 22 and retracted by a lever arm 70 connected at one end to the rod 66, at a point intermediate the ends to an arm pivot 22, and at the other end to a rod of a hydraulic cylinder 74. Cylinder 74 is mounted to a crossbar 76 extending between mounting plates 60.

The support table 102, previously identified, comprises a rectangular turntable 104 with rollers 106 journaled in two opposite sidewalls and extending across the top surface of the table. The table is rotatably journaled to an under carriage mount 108 with a ring gear 110 attached to the underside of the table. An air motor 109 drives the ring gear and table connected thereto through a pinion 111. Three vertically adjustable screw jacks 112, equispaced on a four-wheeled undercarriage 114 beneath the table, carry the mount 108 and are driven in unison through a miter gearbox 116 by means of an electric motor (not shown). The undercarriage is adapted to be moved toward and away from the upender section 10 on parallel rails 118 by means of an electrically driven screwjack 120 mounted on a palletizer secton supporting framework 122. The relative position of the undercarriage to the upender section is indicated by the position of an undercarriage-mounted pointer 121 on a rail-mounted scale 123.

Midway of the table sides that journal mount rolls 106, a roll driving mechanism 124 is carried by the table. As best seen in FIG. 7, this mechanism comprises a drivebelt 126, the upper course of which is maintained in contact with all of the rolls by idler rolls 128 journaled in left- and right-hand side plates 130. The belt 126 is driven by a main drive roll 132 as it passes therearound, guided by idler rolls 134. Drive roll 172 is driven by air motor 136 through a chain drive assembly 138. Because belt 126 contacts all of the rolls 106, these rolls are not freely rotatable but can rotate only when belt 126 is moving.

A beam 140, centered on the undercarriage, cantilevers rearwardly therefrom and mounts a pallet-positioning, inwardly extending air cylinder 142 at an elevation above that of the turntable 104. On the end of the cylinder rod, a 90° V-shaped pallet-positioning foot 149 is attached. At the opposite end of the palletizer section, between the legs of yoke 16 another yoke 150, with vertical legs connected to left- and right-hand beams 32 and a horizontal head, mounts a pallet-positioning assembly 152 at an elevation above that of the turntables 104 but below that of the retractable shoe 50 when the upender frame 12 is in its upright position. The pallet-positioning assembly 152 comprises two pivotable feet 154, each pivotally connected at one end to a frame 156 and pivotally connected at the other end to a bellcrank linkage 158. The bellcrank linkages are operated to swing the feet outward into a parallel relationship or inward into a 90° configuration by air cylinders 160—160 pivotally connected to the bellcranks and to the frame 156. Frame 156 is longitudinally slidable in guides 162 attached to the head of yoke 150 and extended toward the palletizer section 100. Frame 156 is operated by pivotable links 164–166, link 166 being pivotable about pin 168 and having its outer end pivotally attached to a screw block 170 threaded onto a jackscrew 172.

OPERATION OF THE SYSTEM

Beginning with the situation presented in FIG. 1 wherein the turntable 104 is positioned as shown and a pallet is positioned on the turntable and gripped at diagonally opposite corners by positioning feet 149 and 154—154 with an unoccupied pallet corner indexed toward the upender section 10, and wherein two paper rolls have already been upended onto a pallet and another paper roll is laying on the lowered upender section 12, the operation would be as follows.

The retractable shoe is actuated upon passage of the paper roll onto the upender frame and past the photoelectric station 11 to extend a sufficient distance to adequately support the paper roll when upended. Referring to FIG. 3 by way of example, if a paper roll does not cut the lower photo light beam, the shoe will extend to the innermost dotted line position; if the roll cuts the lower beam but not the upper beam, the shoe will extend to the solid line position; and if the roll cuts both beams, the shoe will extend to the outermost dotted line position.

The upender frame 12 is now pivoted upright by extension of the rods of cylinders 26 to the position shown in dotted line in FIG. 2 and in solid line in FIG. 5. Because of the oblique intersection of the yoke 16 with the bed 22, the bed is positioned beyond the yoke 150 such that the paper roll overlays the unfilled pallet corner as shown with shoe 150 barely clearing the pallet corner at point 50b on its tapered bottom face. The shoe is now retraced and the roll pushed away from bed 22 by extension of pusher 66, the roll being lowered without tipping onto the pallet as the shoe retracts by reason of the askew retraction path of the shoe. The roll is now positioned on the pallet as shown in FIG. 6. The upender frame 14 is lowered and the shoe 50 extended to receive another paper roll.

This pallet-positioning foot 149 is now retracted away from the pallet corner and the positioning feet 154—154 are pivoted to their parallel position thereby freeing the pallet from confinement. Turntable 104 is rotated counterclockwise 90° to position the remaining unfilled corner section adjacent the upender section 10, and foot 149 extended and feet 154—154 pivoted to their 90° configuration to lock the pallet into position preparatory to placement of the fourth paper roll.

Upon placement of the fourth and last paper roll onto the pallet, the foot 149 is retracted and the feet 154—154 pivoted to their parallel position to free the pallet, and the turntable rotated 45° to align the pallet with the feedout conveyor (not shown). The turntable roll drive mechanism 124 is then operated to roll the filled pallet off the turntable onto the feedout conveyor.

The turntable is rotated another 45° to align one of the diagonals longitudinally to the upender section and a pallet placed on the turntable in the same relative position as shown in FIG. 1. The screw jacks 112 operate to raise or lower the turntable to position the top of the pallet between upper and lower light beams of a photoelectric station 101 so that the shoe 50 will not jam against the pallet corner.

The undercarriage 114 position relative to the upender section and the slidable frame 156 are adjusted for the dimensions of the pallet such that the pallet will be centered on the turntable with the corner adjacent the upender section, when confined by feet 154—154, properly positioned for the pallet to properly receive the paper rolls to be placed thereon. The foot 149 and feet 154—154 are extended to confine the diagonally opposite pallet corners. The palletizer section is then ready for loading.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. Apparatus which comprises upender means for receiving an object when in a lowered position including a bed section adapted to receive an object to be upended when in a lowered position and means mounting said bed section for slewing from a relatively horizontal lowered position to a relatively upright raised position; means for swinging said upender means to a raised position to upend an object; support means carried by said upender means for supporting an object when said upender means is swung to its raised position, said support means comprising a support member retractably mounted and adapted to be retracted from an object-supporting position by movement relative to said bed section such that an upended object can be lowered onto a platform responsive to retraction of said support member when said upender means is in its raised position; palletizer means for supporting a platform; positioning means for positioning a platform on said palletizer means such that a portion of the platform will underlay said support member when said upender means is in its raised position for receipt of an upended object from said upender means; and means for displacing an upended object away from said bed section comprising a pusher rod slidably contained at the foot of said bed section adjacent said support means, and actuating means to extend and retract said pusher rod.

2. Apparatus which comprises upender means for receiving an object when in a lowered position including a bed section adapted to receive an object to be upended when in a lowered position and means mounting said bed section for slewing from a relatively horizontal lowered position to a relatively upright raised position; means for swinging said upender means to a raised position to upend an object; support means carried by said upender means for supporting an object when said upender means is swung to its raised position, said support means comprising a support member retractably mounted and adapted to be retracted from an object-supporting position by movement relative to said bed section such that an upended object can be lowered onto a platform responsive to the retraction of said support member when said upender means is in its raised position; palletizer means for supporting a platform; positioning means for positioning a platform on said palletizer means such that a portion of the platform will underlay said support member when said upender means is in its raised position for receipt of an upended object from said upender means; and wherein said palletizer means comprises a turntable, means for raising and lowering said turntable, and means for rotating said turntable.

3. Apparatus according to claim 2 wherein said turntable is provided with a plurality of rolls rotatably journaled thereto; and includes a roll driving mechanism comprising an endless belt drivingly engaging said rolls below the top surface of said turntable, and means for driving said belt to rotate said rolls.

4. Apparatus which comprises upender means for receiving an object when in a lowered position including a bed section adapted to receive an object to be upended when in a lowered position and means mounting said bed section for slewing from a relatively horizontal lowered position to a relatively upright raised position; means for swinging said upender means to a raised position to upend an object; support means carried by said upender means for supporting an object when said upender means is swung to its raised position, said support means comprising a support member retractably mounted and adapted to be retracted from an object-supporting position by substantially horizontal movement relative to said bed section such that an upended object can be slid from said support member and lowered onto a platform responsive to the retraction of said support member when said upender means is in its raised position; palletizer means for supporting a platform; and positioning means for positioning a platform on said palletizer means and for holding said platform while said support member is being retracted such that a portion of the platform will underlay said support member when said upender means is in its raised position for receipt of an upended object from said upender means and will be held while receiving the upended object, said positioning means comprising forward and rearward platform corner positioning members mounted on opposite sides of said palletizer means, said forward platform corner positioning member being positioned adjacent to said upender means, and said positioning members being adapted to engage and confine a platform therebetween and being adapted to release a platform to permit movement thereof relative to said positioning members.

5. Apparatus which comprises upender means for receiving an object when in a lowered position including a bed section adapted to receive an object to be upended when in a lowered position and means for mounting said bed section for slewing from a relatively horizontal lowered position to a relatively upright raised position; means for swinging said upender means to a raised position to upend an object; support means carried by said upender means for supporting an object when said upender means is swung to its raised position, said support means comprising a support member retractably mounted and adapted to be retracted from an object-supporting position by movement relative to said bed section such that an upended object can be lowered onto a platform responsive to the retraction of said support member when said upender means is in its raised position; palletizer means for supporting a platform; positioning means for positioning a platform on said palletizer means such that a portion of the platform will underlay said support member when said upender means is in its raised position for receipt of an upended object from said upender means; said positioning means comprising forward and rearward platform corner positioning members mounted on opposite sides of said palletizer means, said forward platform corner positioning member being positioned adjacent to said upender means, said members being adapted to engage and confine a platform therebetween and being adapted to release a platform to permit movement thereof relative to said members; and wherein said forward platform corner positioning member comprises two pivotable feet adapted to pivot outward from one another to a platform releasing position and adapted to pivot inward toward one another to define a V-shaped platform engaging position, and means for pivoting said feet outward and inward in unison.

6. Apparatus which comprises a pivotally mounted frame adapted to receive an object when in a lowered position; means for pivotally swinging said upender frame to a raised position; a support assembly including a shoe retractably mounted on said upender frame and adapted to support an object when said receiving frame is swung to its raised position; means for retracting said shoe relative to said upender frame such that an object can be lowered onto a platform responsive to the retraction of said shoe with said upender frame in its raised position; a turntable for the platform; first means for positioning said turntable relative to said upender frame; second means for positioning the platform on said turntable; said first and second means being interrelated such that said shoe will overlay a predetermined section of the platform with said upender frame in a raised position when said turntable and platform are positioned by said first and second means.

7. Apparatus according to claim 6 wherein said turntable is provided with a plurality of rolls rotatably journaled thereto; and includes a roll driving mechanism comprising an endless belt drivingly engaging said rolls below the top surface of said turntable, and means for driving said belt to rotate said rolls.

8. Apparatus according to claim 6 wherein said positioning means comprises forward and rearward platform corner positioning members mounted independently of said turntable, on opposite sides thereof, said forward platform corner positioning member being positioned adjacent to said upender means, and said members being adapted to engage and confine a platform therebetween and being adapted to release a platform to permit movement thereof relative to said members.

9. Apparatus according to claim 8 wherein said forward platform corner positioning member comprises two pivotable feet adapted to pivot outward from one another to a platform releasing position and adapted to pivot inward toward one another to define a V-shaped platform engaging position, and means for pivoting said feet outward and inward in unison.

* * * * *